United States Patent [19]

Wu et al.

[11] Patent Number: 5,286,792
[45] Date of Patent: Feb. 15, 1994

[54] ABS WITH NOVEL MORPHOLOGY

[75] Inventors: Wan C. Wu, Longmeadow; Vincent A. Aliberti, Wilbraham, both of Mass.

[73] Assignee: Monsanto Company, St. Louis, Mo.

[21] Appl. No.: 576,758

[22] Filed: Sep. 4, 1990

[51] Int. Cl.$^5$ .............................................. C08L 51/04
[52] U.S. Cl. ....................................... 525/84; 525/83; 525/315; 525/316
[58] Field of Search ................... 525/83, 84, 315, 316, 525/903

[56] References Cited

U.S. PATENT DOCUMENTS 4,713,420 12/1987 Henton ................................. 525/236

OTHER PUBLICATIONS

Rubber-Toughened Plastics, C. K: Riew, Advances in Chemistry, Series 222, pp. 45–49 (1989).

*Primary Examiner*—Melvyn I. Marquis
*Assistant Examiner*—D. E. Aylward
*Attorney, Agent, or Firm*—William J. Farrington; Mark F. Wachter

[57] ABSTRACT

Acrylonitrile-butadiene-styrene-ester compositions having a unique rubber phase morphology are prepared by a continuous mass polymerization process. The compositions have an improved balance between impact and tensile strengths and gloss.

5 Claims, 6 Drawing Sheets

FIG. 1 – Process Schematic for the Continuous Mass Polymerization System

FIG. 3A

Prior Art
ABS—Suspension
Process 10,000 x
MAGNIFICATION

FIG. 3B 22,000 x
MAGNIFICATION

Prior Art
ABS Continuous
Mass Process 10,000 x
MAGNIFICATION

FIG. 4A 22,000 x
MAGNIFICATION

ABS WITH NOVEL MORPHOLOGY

BACKGROUND OF THE INVENTION

This invention relates to acrylonitrile-butadiene-styrene-ester polymers (ABSE) having a rubber phase with a novel morphology.

DESCRIPTION OF THE PRIOR ART

Various rubber phase morphologies for HIPS and ABS are shown in ADVANCES IN CHEMISTRY SERIES 222; Rubber-Toughened Plastics, C. Keith Riew, Editor, American Chemical Society, Washington, D.C., pages 24 to 50 (1989). U.S. Pat. No. 4,097,549 to R. L. Kruse shows a particular rubber phase morphology for HIPS.

SUMMARY OF THE INVENTION

Disclosed herein is an ABSE composition having a novel rubber phase morphology and a process for preparing ABSE compositions having a balance of performance properties.

It is a principal object of this invention to provide an ABSE composition with a novel rubber phase morphology and a desirable balance of properties.

The above objects are obtained by preparing ABSE compositions by a process which comprises the steps of (i) in a first reactor, continuously mass polymerizing a mixture of monomers comprising monoalkenyl aromatic monomer, ethylenically unsaturated nitrile monomer and a polymerizable ester in the presence of a preformed graftable rubber to graft a portion of the polymerizing monomers onto said rubber, wherein a bimodal distribution of grafted rubber particles is formed; and (ii) continuing the polymerization in one or more subsequent reactors, wherein a bimodal distribution of rubber particles are formed; and then (iii) devolatilizing the ABSE composition.

In particular the ABSE of the present invention has a matrix phase comprising a copolymer of a monoalkenyl aromatic monomer, an ethylenically unsaturated nitrile monomer and a copolymerizable ester and a dispersed phase comprising rubber particles having a grafted superstrate of a copolymer of a monoalkenylaromatic monomer, an ethylenically unsaturated nitrile monomer and a copolymerizable ester; wherein the ABSE polymer is characterized by having the following properties:
(a) a gloss level of at least 50%;
(b) an Izod impact of at least 120 J/M;
(c) an IDI impact of at least 15 J;
(d) a tensile strength of at least 36 MPa;
(e) a melt viscosity (KPa-S) of less than 0.45; and a rubber phase morphology characterized by having a bimodal distribution of rubber particles wherein 10 to 30% of the rubber particles have a Dw of from 0.6 to 1.0 micron ($\mu$) and 70 to 90% of the rubber particles have a Dw of from 0.2 to 0.6 microns and wherein the smaller particles are substantially free of occluded matrix polymers and wherein a majority of the large particles have a low level of occluded matrix polymer and exhibit the structure shown in the large particles in FIG. V. A process for preparing the ABSE of the present invention comprises:
(i) continuously charging a feed stream of monalkenylaromatic monomer, an unsaturated nitrile monomer, a copolymerizable ester monomer and a ketone solvent having dissolved therein from 3 to 20% by weight of a diene rubber to a stirred reactor, wherein the amount copolymerizable ester is in the range of from 5% to 15% by weight based on the total weight of the monomers being charged;
(ii) simultaneously and continuously charging a separate feed stream comprising an ethylenically unsaturated nitrile monomer, a monoalkenylaromatic monomer and a ketone solvent to the stirred reactor;
(iii) continuously polymerizing the mixture while maintaining stirring such that the polymerizing mixture has a substantially uniform composition and such that the rubber is dispersed in the polymerizing mixture;
(iv) continuously separating the ABSE polymer from the polymerizing mixture from step (iii).
(v) continuously separating the ABS polymer from the polymerizing mixture from step (iv).

DESCRIPTION OF THE DRAWINGS

FIG. I is a schematic of one embodiment of the apparatus and process used in the present invention. FIG. 1 shows two polymerization reaction vessels R1 and R2 and the devolatilizer DV and a particular polymer formulation and reaction conditions. Additional polymerization reaction vessels may be used as well as variations in the charge and reaction conditions.

FIG. II - Curve A (solid line) shows the bimodal distribution of rubber particles obtained with the present process. Curve B (dotted line) shows a bimodal ABS composition of the prior art where the bimodal distribution was obtained by blending a small and a large rubber particle size ABS.

FIGS. IIIA and B, which are photomicrographs of a prior art ABS, show the rubber particle morphology of an ABS composition made by a suspension process at three different magnifications: 10,000 and 22,000 times in IIIA and IIIB respectively. Substantially all of the rubber particles have occluded SAN which show up as the lighter spheroids within the darker rubber particle's.

FIGS. IVA and B, which are photomicrographs of a prior art ABS made by a continuous mass process, show that a major amount of the rubber particles have occluded styrene acrylonitrile (SAN) copolymer. In a minor amount of the particles, especially the larger particles, the occluded SAN appears not as discrete spheroids but as an interpenetrating network.

FIGS. VA and B, which are photomicrographs of the ABSE of the present invention, show that a major amount of the smaller rubber particles (i.e. less than about 0.6 microns ($\mu$) are free of occlusion and that in a major amount of the larger particles (i.e. greater than about 0.6 microns ($\mu$), the occluded styrene acrylonitrile ester polymer (SANE) is not in the form of discrete spheroids. Rather the occluded SANE is in the form of an interpenetrating network. This unique morphology is the result of the processes described herein.

This is in sharp contrast to the grafted rubber particles of the prior art where the small and large rubber particles contain occlusions of the grafted polymer, e.g. SAN in the form of discrete spheroid particles as is shown in FIG. III.

GRAFT SUPERSTRATE AND MATRIX COPOLYMER

Figure 1:
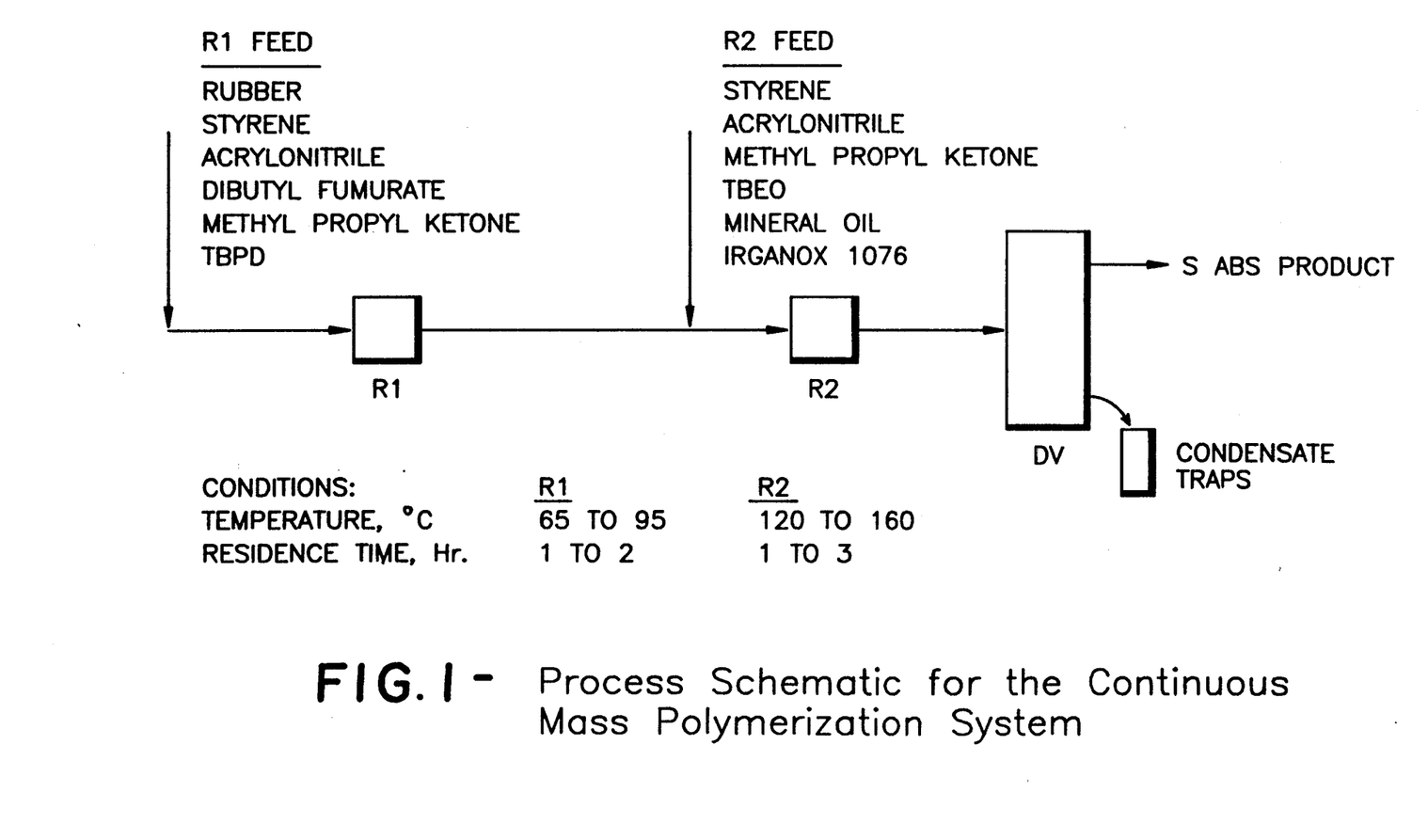
Figure 2:
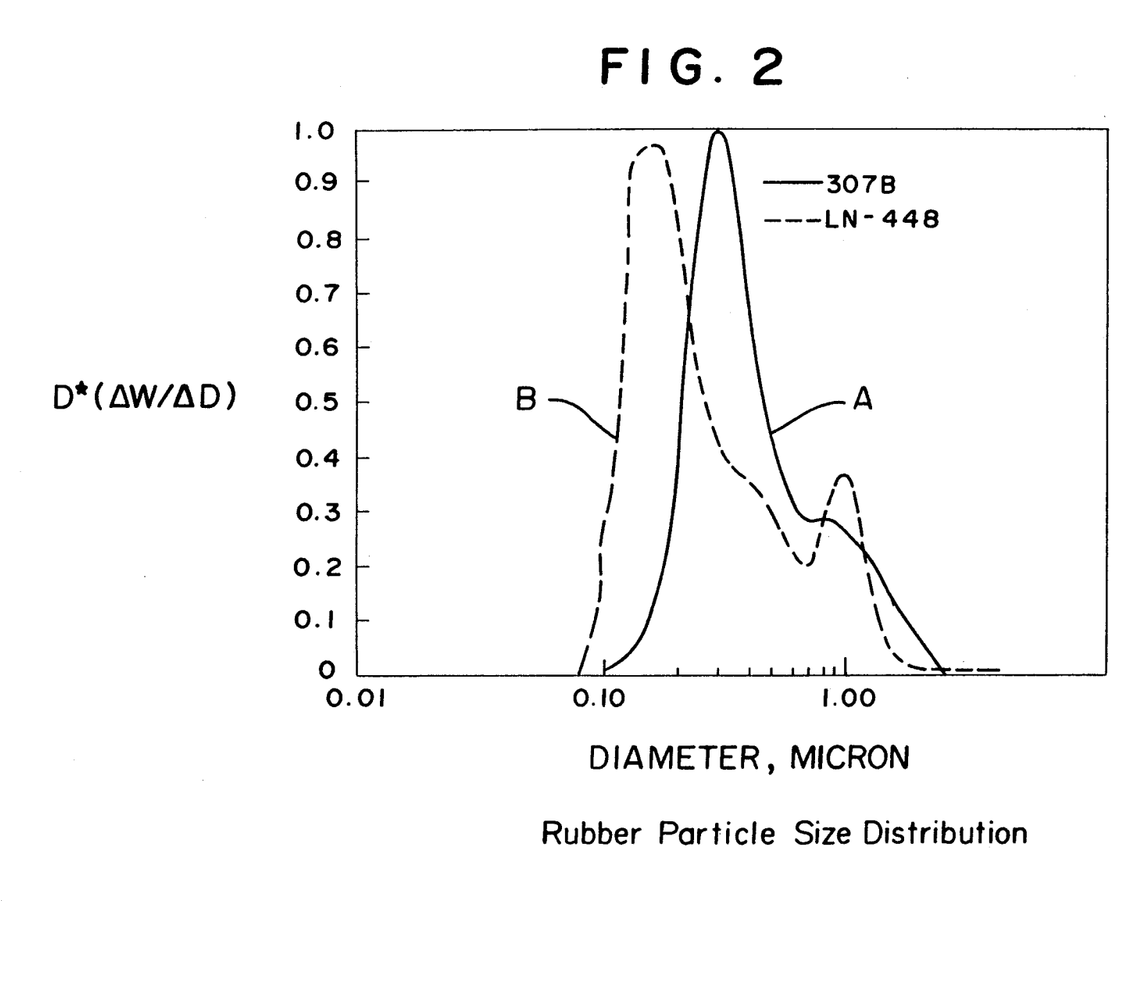
Figure 3A:
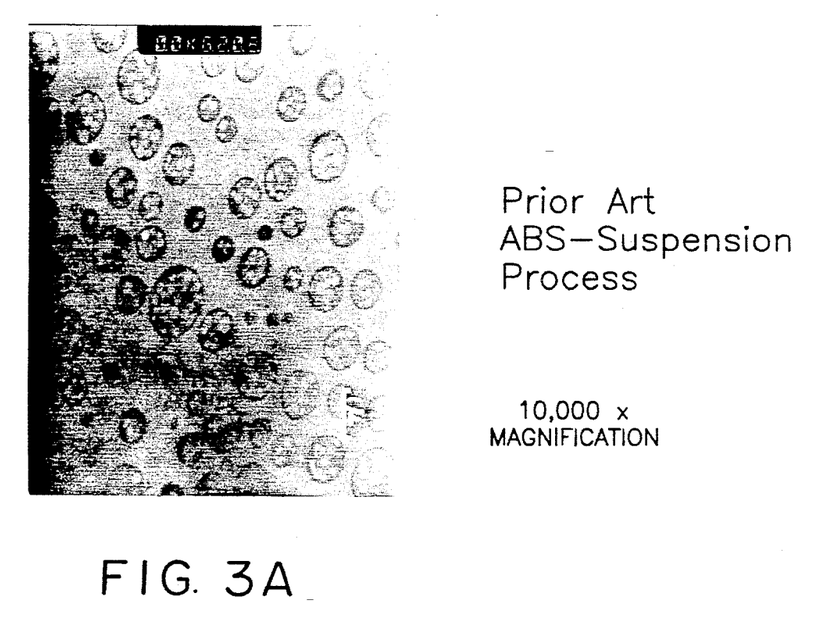
Figure 3B:
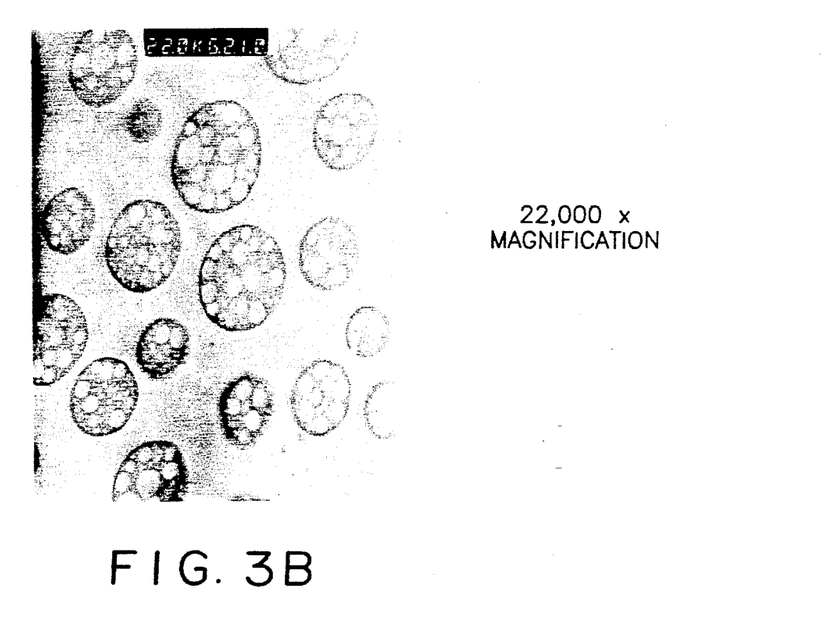
Figure 4A:
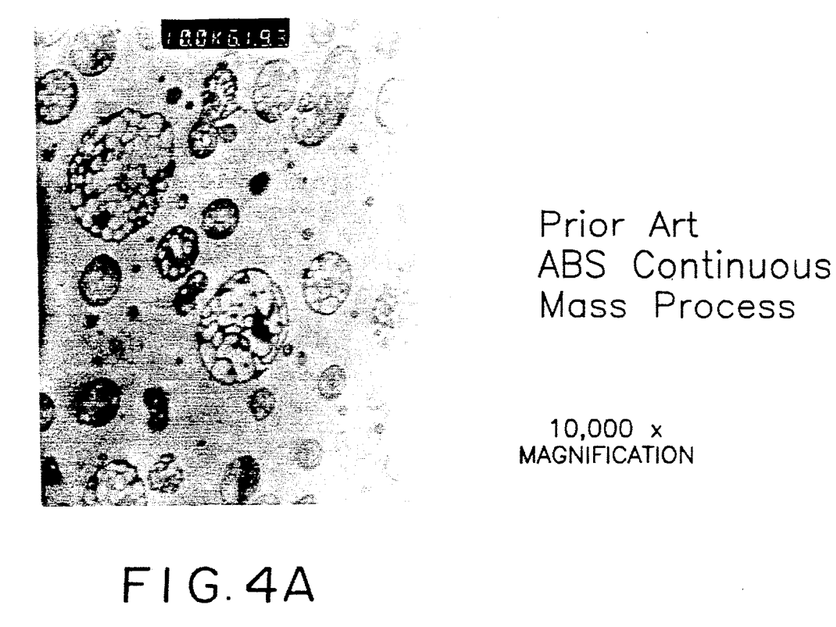
Figure 4B:
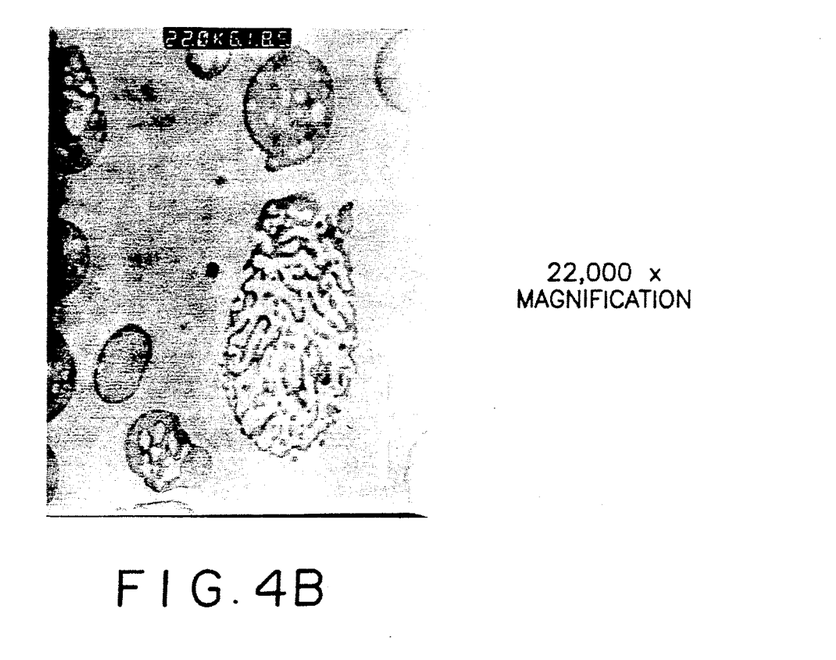
Figure 5A:
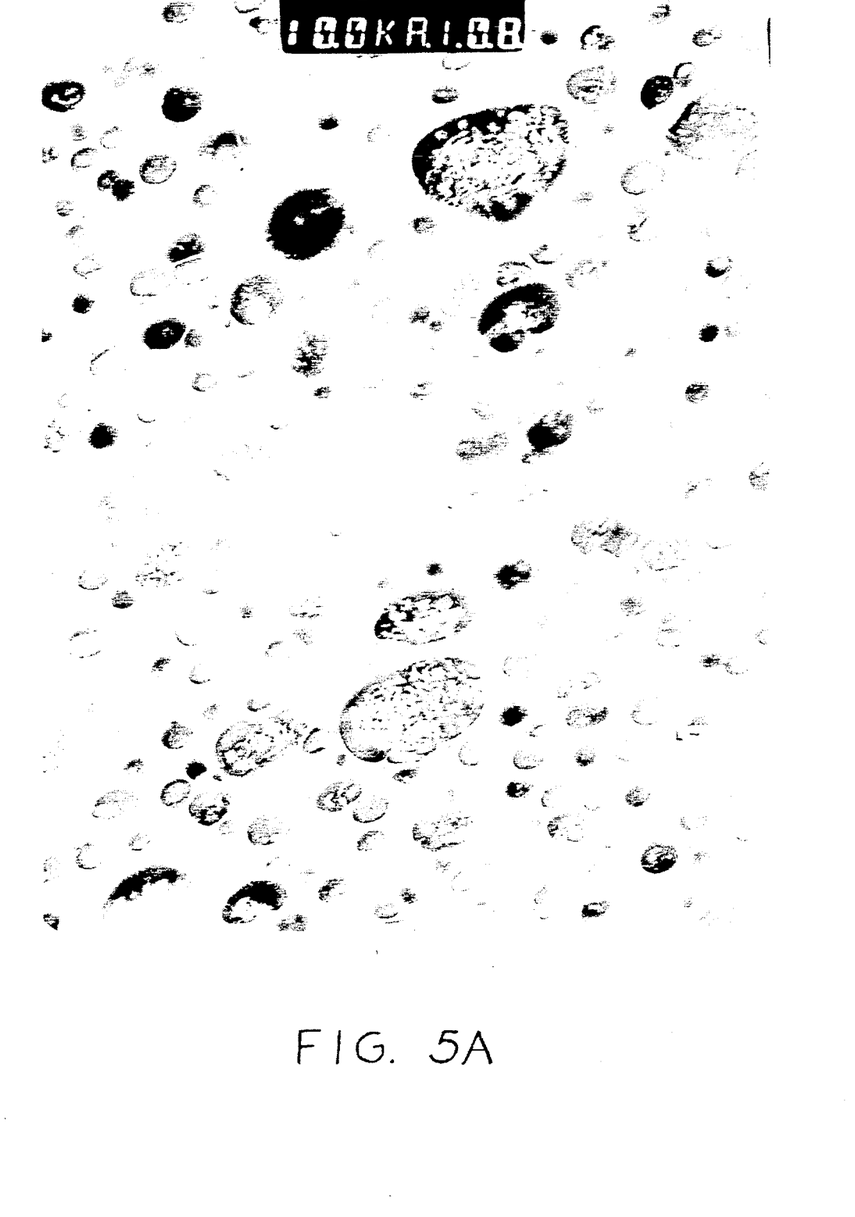
Figure 5B:
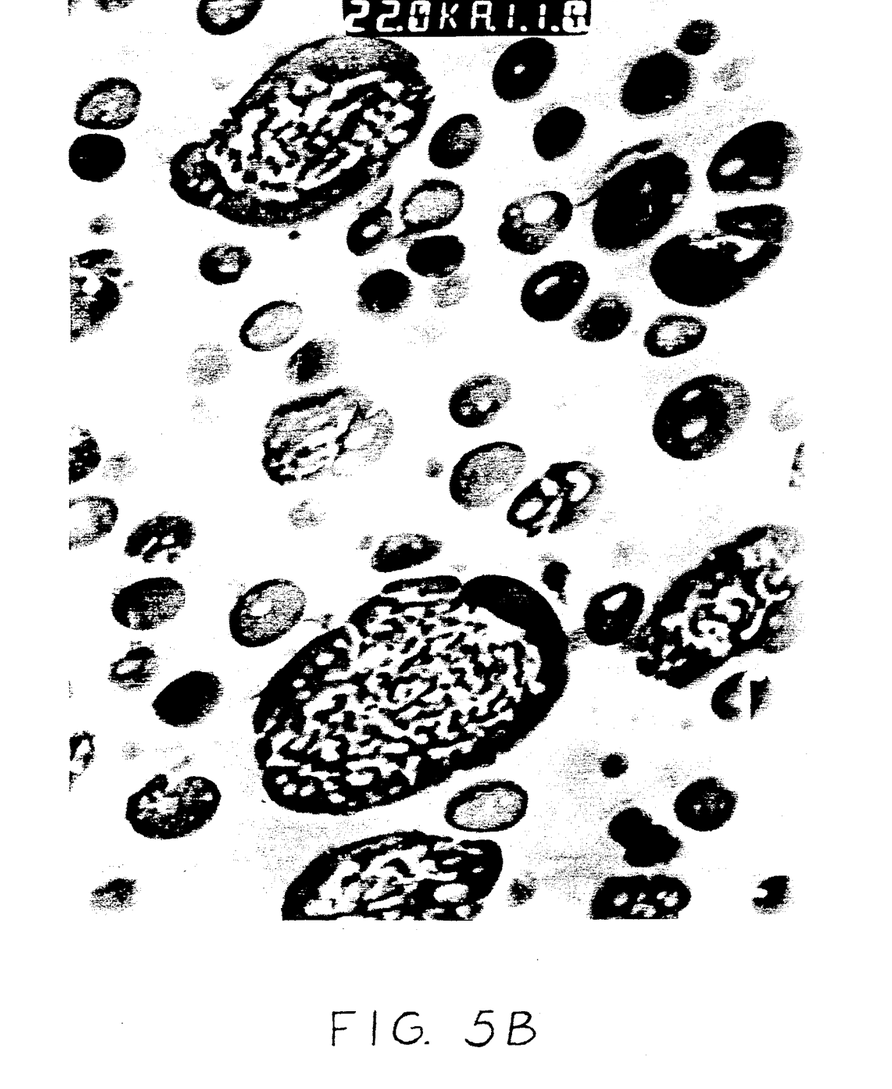

The monomers grafted on the rubber substrate, sometimes referred to herein as the "graft superstrate", and the ungrafted matrix copolymers of the ABSE compositions comprise monoalkenyl aromatic monomer, ethylenically unsaturated nitrile monomer and ethylenically unsaturated monomeric esters which are a whole or partial ester of a mono or dicarboxylic acid. Such monomers comprise at least 50.0 percent by weight and preferably at least 75.0 percent by weight of the combined weight of graft superstrate and matrix copolymer. Most desirably, such monomers comprise at least 90.0 percent by weight of the graft superstrate and matrix copolymer. Minor amounts, i.e., less than 5.0 percent by weight of other components such as chain transfer agents, modifiers, etc., may be included.

Exemplary of monoalkenyl aromatic monomers which may be used in the graft superstrate and matrix copolymers are styrene; alpha-alkyl monoalkenyl monoaromatic compounds, e.g. alpha-methyl-styrene, tert-butyl styrene, alpha-ethylstyrene, alpha-methylvinyltoluene, alpha-methyl dialkylstyrenes, etc.; ring-substituted alkyl styrenes, e.g. vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, 2,4 dibromostyrene, etc.; ring-alkyl, ring-halosubstituted styrenes, e.g. 2,chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monoalkenyl aromatic monomers may be employed.

Exemplary of ethylenically unsaturated nitriles which may be used in the graft superstrate and matrix copolymer are acrylonitrile, methacrylonitrile, ethacrylonitrile, and mixtures thereof.

Exemplary of monomeric esters are dialkyl fumarates, dialkyl maleates and dialkyl itaconates, wherein the alkyl group contains from 2 to 6 carbon atoms. vinyl acetate, vinyl propionate and the like (hereinafter referred to as the "ester monomer").

Optionally, minor amounts of other copolymerizable monomers such as methyl methacrylate, butyl acrylate, methyl acrylate, and 2-ethyl hexyl acrylate may be used in the graft superstrate and matrix copolymer provided that they do not adversely affect the balance of properties of the resulting ABSE compositions (hereinafter referred to as the "other monomer").

The polymerizable monomer mixtures forming graft superstrate and matrix coplymer contain at least 20 percent by weight of the monoalkenyl aromatic monomer and preferably at least 50 percent by weight thereof. They also contain at least 5 percent by weight of the ethylenically unsaturated nitrile and preferably at least 10 percent by weight thereof. In addition, the monomer mixtures contain at least 5 percent by weight and preferably about 10 percent by weight of the ester monomer.

From the standpoint of highly advantageous commercial practice, the monomer formulations contain 20 to 85 percent, and preferably 45 to 80 percent, by weight of the monoalkenyl aromatic hydrocarbon and 65 to 10 percent, and preferably 40 to 15 percent, by weight of the ethylenically unsaturated nitrile, and 5 to 15 percent by weight of the ester monomer.

The amount of rubber used is such that the final ABSE polymer contains 10 to 25% by weight of rubber based on the total polymer weight. Also it is understood that when the ester monomer is used up during polymerization, the polymer being formed will be a copolymer of the monoalkenyl aromatic monomer, the ethylenically unsaturated monomer and any optional other monomers. In reporting matrix molecular weight the value given is for the matrix which comprises SANE and SAN.

RUBBER SUBSTRATE

The preferred rubbers are diene rubbers or mixtures of diene rubbers, i.e., any rubbery polymer (a polymer having a second order transition temperature not higher than 0° centigrade, as determined by ASTM Test D-746-52T) of one or more conjugated 1,3 dienes, e.g., butadiene, isoprene, piperylene, chloroprene, pentadiene, etc. Such rubbers include homopolymers and random interpolymers of conjugated 1,3-dienes with up to 10 percent by weight of one or more copolymerizable monoethylenically unsaturated monomers, such as monoalkenyl aromatic monomers; acrylonitrile, methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.).

The preferred rubbers are those consisting essentially of 100 percent by weight of butadiene and/or isoprene. Particularly advantageous butadiene homopolymer are those having a weight-average molecular weight in the range of 175,000 to 225,000, solutions of which are essentially gel free, i.e. free of undissolved rubber. Butadiene rubber with higher molecular weights have a tendency to yield larger rubber particles in the final products, which is undesirable for high gloss, while those with lower molecular weights are more difficult to handle or process.

GRAFT POLYMERIZATION PROCESS

The rubber graft copolymers are prepared by polymerizing monomers of the matrix copolymer in the presence of the preformed rubber substrate. In such graft polymerization reactions, the preformed rubber substrate is dissolved in the monomers which are polymerized so that at least a portion of the monomers are combined chemically or grafted onto the rubber substrate. Depending upon the ratio of monomers to rubber substrate and polymerization conditions, it is possible to produce both the desired degree of grafting of the monomers onto the rubber substrate and, at the same time, polymerization of the monomer to form ungrafted copolymer.

Although the amount of superstrate grafted onto the rubber substrate may vary from as little as 10 parts by weight per 100 parts of substrate to as much as 250 parts per 100 parts, and even higher, the preferred rubber graft copolymers have a superstratesubstrate ratio of about 30–200:100 and most desirably about 70–150:100. With graft ratios above 30:100, a highly desirable degree of improvement in various properties generally is obtained.

CONTINUOUS MASS POLYMERIZATION PROCESS

In the preferred continuous mass polymerization process, the rubber substrate is initially dissolved in the monomers and solvent and this solution, the initiator and any other optional components are continuously charged to a stirred reactor which provides a continuous polymerization zone. Preferably substantially all of the ester monomer, e.g. dibutyl fumarate, is charged initially as this monomer influences the formation of the rubber particles and the preservation of the integrity of these particles during the polymerization reaction. Part of the styrenic, nitrile and optionally other monomers are subsequently added to the polymerizing mass.

A plurality of reactors may be employed in series with each operating in a continuous mode in which the polymerization is advanced to the required conversion. Alternately a single reactor may be used provided that the polymerizing mass moves through the reactor allowing continuous introduction of monomers and other materials into the polymerizing mass. After polymerization has progressed to the desired conversion level, the residual monomer is stripped from the polymer. The devolatilizing operation, which is the same whether one or a series of polymerization reactors is employed, is conventionally done in a separate device such as a wiped film or falling strand devolatilizer.

The polymerization may be initiated by any free radical generating initiator that promotes grafting and is activated at the contemplated reaction temperatures. Suitable initiators comprise the conventional monomer-soluble peroxy and perazo compounds. Exemplary initiators are t-butyl-peroxyneodecanoate, t-butyl-peroxy-2-ethylhexanoate, 1-t-butylazo-1-cyanocyclohexane, di-tert-butyl peroxide, benzoyl peroxide, lauroyl peroxide, oleyl peroxide, toluyl peroxide, di-tertbutyl diperphthalate, tert-butyl peracetate, tert-butyl perbenzoate, dicumyl peroxide, tert-butyl peroxide isopropyl carbonate. 2,5-dimethyl-2,5 di(tert-butylperoxy)hexane, 2-5,dimethyl-2,5-di(tert-butyl peroxy)-hexyne3,tert-butyl hydroperoxide, cumene hydroperoxide, p-methane hydroperoxide, cyclopentane hydroperoxide, diisopropylbenzene hydroperoxide, p-tert-butylcumene hydroperoxide, pentane hydroperoxide, 2,5-dimethyl-hexane-2,5-dihydroperoxide, as well as percarbonate compounds such as t-butyl-2-ethylhexyl-monoperoxycarbonate, etc. and mixtures thereof.

The initiator is generally included within the range of 0.001 to 1.0 percent by weight, and preferably on the order of 0.005 to 0.5 percent by weight of the polymerizable material, depending upon the monomers and the desired polymerization cycle.

It is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

The solvent, e.g. MPK serves many functions including reducing the rate of polymerization, reducing polymer molecular weight and regulating the rubber particle size and rubber phase morphology.

Preferably part of such diluent is introduced initially with the rubber in monomer solution either as an added component or by use of a rubber which is already dissolved in a suitable solvent. The remaining portion of diluent is added subsequently to one or more of the reactors.

The diluents can be liquid aromatic hydrocarbons containing 6 to 10 carbon atoms, e.g. benzene, toluene, xylene, ethyl benzene, para cumene, cumene or mixtures thereof. Other organic solvents such as saturated aliphatic hydrocarbons, e.g., hexane, cyclohexane, cyclopentane and others having 5 to 7 carbon atoms, ketones, e.g. methyl ethyl ketone, methyl cyclopentane, methyl isobutyl ketone, cyclohexane or methyl propyl ketone can also be used. Methyl propyl ketone is preferred.

In the preferred process, part of the styrenic and nitrile monomers and substantially all of the ester monomer and dissolved rubber are continuously charged to a well-mixed polymerization reaction zone. Initially the copolymer being formed from the monomer composition is dissolved in the monomers. The polymerized mass is continuously removed from the initial reaction zone and replenished by charging at a rate about equal to the rate at which the monomers are polymerized and advanced. The mixture of withdrawn polymer and monomer is passed through one or more devolatilizers of the type referred to above to separate out the polymer which may then be pelletized in conventional apparatus while the separated monomer is condensed and returned to the reaction zone. Chain transfer agents and liquid solvents, initiators, and other additives of the type described above with respect to the continuous mass graft polymerization process may be charged continuously with the monomer composition or separately to the reaction zone.

The ABSE polymers produced by the continuous mass processes of the present invention are characterized by the following balance of properties:

Gloss - at least 50% and preferably at least about 70%

Izod Impact - at least 120 J/M and preferably at least about 250 J/M.

IDI Impact - of at least 15 J and preferably greater than 23 J.

Tensile - a tensile strength of at least 36 MPa and preferably at least 42 MPa. Flow - a melt viscosity (KPa-S) of less than 0.45 and preferably less than 0.25.

In addition the ABSE polymers have a rubber phase morphology characterized by a bimodal distribution where 10 to 30% of the rubber particles have a Dw of from about 0.6 to about 1.0 micron ($\mu$) and 70 to 90% of the rubber particles have a Dw of from about 0.2 to 0.6 microns and wherein the smaller particles are substantially free of occluded matrix polymers and wherein a majority of the large particles have a low level of occluded matrix polymer as represented by the structure of the large particles in FIG. VA and B.

DESCRIPTION OF PREFERRED EMBODIMENTS

In the following examples the following explanations apply:

Apparatus: The polymerization was carried out in a two reactor system wherein the first reactor is designated R1 and the second reactor as R2. Each reactor is equipped with conventional stirring, temperature control and sampling means well known to those skilled in the art. A devolatilizer (DV) of the wiped film type is used after R2 to remove unreacted monomers and solvent from the polymer. A conventional pelletizer is used to pelletize the polymer.

Polymerization Process: One part of a polybutadiene rubber, sufficient for a thirty-four hours continuous run at approximately 1 lb./hour is cut into small cubes and then mixed with four parts of styrene monomer with agitation for at least twenty-four hours until the rubber is completely dissolved. To this rubber solution is then added the required balance of styrene, acrylonitrile, dibutyl fumarate and solvent (methyl ethyl ketone or methyl propyl ketone) and agitation is continued for two hours. Initiator, chain-transfer agent and other additives are then weighed and charged with the delayed monomer feeds about two hours before the feeds are poured into the load-cells connected with the pumps feeding the reactors.

During start-up, the reactors are first filled with a start-up solution typically as given below:

| Styrene | 2.5 kg |
|---|---|
| Acrylonitrile | 1.0 kg |
| Methyl ethyl ketone | 1.0 kg |
| T-butyl peroctoate | 1.5 gram |

The load-cells are then emptied by vacuum and then charged with their respective feeds. The start-up solutions in the reactors are then heated up under agitation. When the temperature approaches the set values, the feed pumps are started at half the target flow rates and gradually increased to full rate as the solids build up in the reactors with time. If needed, additives, such as stabilizers, plasticizers, etc. are added to the ABSE between R2 and DV via a pump.

The course of the polymerization is monitored by continuously recording and displaying flow-rates to the reactors, reactor temperatures, pressure, agitation rate and amperage, and by sampling and determining, off-line, the polymer solids formed in the reactor syrups at regular one-hour intervals. Rubber particle size and size distribution are also measured off-line. In general, it took about twenty hours for a run to reach steady state conditions. Polymerization was typically allowed to continue under steady state operation for three to four more hours such that enough material could be collected for property/performance evaluations as well as structure/morphology characterization.

Product compositions and properties were determined using the following:

Rubber level was determined from a material balance (MB) of input feeds and output products.

Rubber particle size distribution was measured in a disc centrifuge operating at 2250 RPM and containing a 50/50 DMF/acetone mixture. Approximately 0.2 mg of particles were injected as a dispersion in 2 mg particle/ml of acetone. The results are reported as weight average particle size diameter (Dw) in microns ($\mu$).

Rubber particle morpholoqy was examined on $OsO_4$ stained cyromicrotomed thin sections using a Philips CM12 transmission electron microscope.

Gel level was measured by dispersing one gram of polymer in 5 grams of MEK and measuring the fraction which was recovered after centrifuging for four hours at 22,500 RPM in a Beckman Model L ultracentrifuge. The difference between the gel level and rubber level was the graft and occluded SANE copolymers.

Swelling index was measured by swelling the recovered gel from above in THF for five hours, decanting and measuring the soluble portion and then determining the swollen weight to dry weight of the non-soluble polymer.

Acrylonitrile level was measured using elemental carbon-hydrogen-nitrogen (CHN) analysis.

Dibutyl fumarate level was measured using elemental oxygen analysis.

Matrix molecular weight (Mv) was measured using conventional intrinsic viscosity and gel permeation chromatography techniques. Results are reported as viscosity average molecular weight $\times 10^{-3}$ (e.g. a value of 189,000 is reported as Mv=189)

Oligomers level was determined using gas chromatograph techniques.

Glass transition temperature, Tg was determined by DSC on about 20 mg sample of the methanol (MeOH) precipitated matrix polymer from the ABS samples.

Vicat Softening Temperature: ASTM D-1525.

Inverted Dart Impact (IDI): a dart with a hemispherical head of 0.013 meters diameter was used against which the specimen was driven at a constant speed of 1.86 meters/sec. The impact values are reported in Joules (J).

Notched Izod Impact (J/m): ASTM D-256-70, results reported in Joules/meter notch. Tensile Strength at Yield (MPa): ASTM D-638-61T results reported in terms of megapascals (MPa).

Apparent Viscosity (KPa-S): A capillary Extrusion Rheometer at 204° C. is used. The viscosity at specific shear rates was calculated using the technique described in "Automatic Capillary Rheometer, Instruction Manual for Model 3501-H" published by Monsanto Research Corp. (Apr. 1972 edition).

Gloss-Percent Specular Reflectance ($R_s$): HUNTER-LAB DORI-GON METER MODEL D47R-6 from Hunter Associates Laboratory at Reston, Va; sample molded in 2.5 seconds at 232° C.

| ABBREVIATIONS USED | |
|---|---|
| AN | acrylonitrile |
| CTA | chain transfer agent |
| DBF | dibutyl fumarate |
| DMF | dimethyl formamide |
| DSC | differential scanning calorimeter |
| DV | devolatilizer |
| Dw | rubber particle size expressed as weight average diameter in microns ($\mu$) |
| Diene 35 | a butadiene homopolymer rubber sold by Firestone |
| E | ester monomer |
| IOT | iso-octyl thioglycolate |
| Irganox 1076 | an antioxidant sold by Ciba Geigy |
| KPa-S | kilopascals-second |
| MB | material balance |
| MEK | methyl ethyl ketone |
| MPK | methyl propyl ketone |
| $OsO_4$ | osmium oxide |
| R1/R2 | followed by name of material or amounts indicates type of material or amounts in R1 and R2 |
| SAN | poly(styrene acrylonitrile) |
| SANE | poly(styrene acrylonitrile ester) |
| THF | tetrahydrofuran |
| Product | is the polymeric product obtained after devolatilizer (DV) operation, i.e. the final ABSE product. |
| R1 | first polymerization reactor |
| R2 | second polymerization reactor |
| S | styrene |
| SI | swelling index |
| Steron 721A | a 90/10 butadiene/styrene block copolymer rubber sold by Firestone |
| TBPD | t-butyl peroxyneodecanoate |
| tDM | tertiary dodecyl mercaptan |
| TBEC | t-butyl ethyl hexyl mono peroxy carbonate |

EXAMPLE 1

This Example is a comparison of a prior art process (Control) with a process of the present invention (Example 1).

|  | Control | Example 1 |
|---|---|---|
| Feeds | R1/R2 | R1/R2 |
| Solvent Type | MEK/MEK | MPK/MPK |
| Rubber Type | Stereon 721A | Diene 35 |
| Initiator Type | TBPD/O | TBPD/TBEC |
| CTA Type | tDM/tDM | O/IOT |
| % Rubber | 7.3/0 | 8.3/0 |
| % Styrene | 43.6/13.7 | 43.7/1.0 |
| % AN | 14/4.8 | 9.5/10.0 |
| % DBF | 0/0 | 6.0/0 |
| % Solvent | 16.3/0 | 11.9/8.2 |
| % Initiator | 0.033/0 | 0.028/0.062 |
| % CTA | 0.03/0.1 | 0.0/0.082 |
| % Mineral Oil | 0/0 | 0.0/1.15 |
| % Irganox 1076 | 0/0.055 | 0.0/0.087 |
| Subtotal | 81.3/18.7 | 79.4/20.6 |
| Conditions | R1/R2/DV | R1/R2/DV |
| Temperature (°C.) | 85/165/230 | 81/147/245 |
| Residence Time (hrs) | 2.0/0.81 | 2.03/1.667 |
| % Solids | 28.3/56.1 | 25.6/63 |
| R1 SANE/Rubber Ratio | 2.13 | 1.44 |

The properties of the polymeric compositions obtained after the R1 reaction and after the DV (i.e. the final product) are listed below:

|  | Control | Example 1 |
|---|---|---|
| Structure R1/DV |  |  |
| % Rubber | 32/13 | 40.9/13.2 |
| % Graft | 50/100 | 48.0/78.7 |
| Dw | 0.6/0.6 | —/0.519 |
| Mv matrix | 189/105 | 206/111 |
| Product Properties |  |  |
| IDI, Joules | 18.6 | 23.9 |
| Izod, J/m | 190 | 140.6 |
| Tensile at Yield, MPA | 43.7 | 41.94 |
| Viscosity, KPa-S @ 1000 sec$^{-1}$ | 0.40 | 0.26 |
| Gloss, % | 10.6 | 69.3 |

Many inventive modifications are made to the prior art processes, which in combination provide the improved balance of performance properties in the polymers prepared by the processes of the present invention. These modifications include (1) the use of a combination of lower temperature in R1 and R2, lower solvent level in R1 and the use of additional solvent in R2, lower initiator level in R1 and higher in R2 to maintain an optimum balance of grafting, molecular weight and polymer/rubber ratio control; (2) the use of a solvent such as MPK in both R1 and R2 to get smaller rubber particles with a narrower particle size distribution; amd (3) the use of solid polybutadiene homopolymer rubber (Diene 35) in combination with a high level of an ester such as DBF (about 10% by weight based on total monomer feed to R1).

It is believed that DBF levels of from 5 to 15% by weight, based on the total weight of monomers in R1, make the graft macromolecules a better solvent for the dispersion medium (i.e. styrene-acrylonitriledibutyl fumarate copolymer in melt-state) and thus better stabilizers for the rubber dispersion in the final products at elevated temperature during injection molding, which results in higher molded gloss. When a high level of DBF is used, not only is the composition of the polymer made in the reactors changed, but also the composition of the dispersion medium since the dispersion and stabilization of the dispersed rubber phase is mainly determined by how the graft macromolecules thermodynamically interact with the continuous medium, which at low solids is mainly controlled by the nature of the small molecules (i.e. unreacted monomers and solvent). The presence of DBF groups (in the graft and the continuous medium) have apparently enhanced the solvency interaction between the surface graft and the continuous phase, leading to better rubber dispersion, and resulting in formation of smaller and more stable rubber particles in the reactor. However, applicants are not to be bound by this theory.

With respect to Example 1 formulation and process conditions in the second reactor (R2), no additional DBF is charged to R2 in order to minimize the DBF level in the copolymer made in R2 the R2 feed has high acrylonitrile and solvent level and low styrene level to make copolymer with higher AN level and to convert the continuous medium to a poor solvent for the polybutadiene rubber and a very good solvent for the graft and matrix macromolecules. Under these conditions, internal grafting in the dispersed rubber phase is minimized as the monomers are predominantly partitioned in the continuous phase and surface grafting of SANE copolymer onto the rubber particles is enhanced, which is desirable for stabilizing the rubber dispersion in R2 and DV. This gives rise to the morphology shown in FIG. V where the smaller rubber particles are substantially free of occlusions and where the larger rubber particles contain the SANE copolymer substantially as an interpenetrating network with a minor amount of spheroidal occlusions. Other significant changes made versus the prior art process are: (1) lower polymerization temperature in R2 to reduce oligomer formation and to increase the Tg of the matrix polymer; (2) the use of an initiator (TBEC) in R2 to control the conversion; and (3) the use of IOT as chain transfer agent in R2 but not in R1 to control the molecular weight.

EXAMPLE 2

This Example shows the advantage of the use of a butadiene homopolymer (Diene 35) of medium molecular weight (Mw=about 200,0000) over butadiene/styrene block rubber copolymer (Stereon 721A) having a molecular weight of Mw=about 185,000. The polymerization process details and properties of the resulting ABSE are set forth below.

|  | Example 2A | Example 2B |
|---|---|---|
| Feeds | R1/R2 | R1/R2 |
| Solvent Type | MEK/MEK | MEK/MEK |
| Rubber Type | Stereon 721A | Diene 35 |
| Initiator Type | TBPD/O | TBPD/O |
| % Rubber | 8.4/0 | 8.4/0 |
| % Styrene | 42.8/3 | 42.8/3 |
| % AN | 8.6/13.1 | 8.6/13.1 |
| % DBF | 6./0 | 6/0 |
| % Solvent | 14.4/3.6 | 14.4/3.6 |
| % Initiator | 0.029/0 | .029/0.000 |
| % Irganox 1076 | 0/0.08 | 0/0.08 |
| Subtotal | 80.2/19.8 | 80.2/19.8 |
| Conditions | R1/R2/DV | R1/R2/DV |
| Temperature (°C.) | 83/160/231 | 83/166/231 |
| Residence Time (hrs.) | 1.96/1.57 | 1.96/1.57 |
| % Solids | 24/55 | 23.5/56 |
| R1 SANE/Rubber Ratio | 1.29 | 1.24 |

-continued

| | Example 2A | Example 2B |
|---|---|---|
| COMPARISON OF EXAMPLES 2A AND 2B | | |
| Rubber Type | Stereon 721A | Diene 35 |
| % Rubber | 15.3 | 15.1 |
| % Graft | 52 | 63.9 |
| Dw | 0.37 | 0.63 |
| Mv Matrix | 101 | 87 |
| Product Properties | | |
| IDI, Joules | 23 | 23 |
| Izod, Joules/m | 288 | 179 |
| Tensile Strength at Yield, MPA | 41.7 | 36.7 |
| Viscosity, KPA-S @ 1000 sec$^{-1}$ | 0.37 | 0.35 |
| Gloss | 16.8 | 41.5 |

The results show that Diene 35 provides ABSE with larger rubber particles. Despite the larger rubber particle size which the prior art teaches to reduce gloss, the Diene-35 based sample unexpectedly exhibited much higher gloss. Sample 2B with an average rubber particle size of 0.63 $\mu$ had a molded gloss of 41.5, which is very high gloss for that rubber particle size.

EXAMPLE 3

This Example shows the effect of using a lower level of solvent in R1 and a lower R1 temperature to give a higher Mv (SANE) for the R1 polymer. The polymerization process of Example 2B and Diene 35 rubber is used here except that the amount of solvent used in R1 is reduced from 17.9% to 14.9% based on the total weight of the reaction mixture and 0.183% of IOT is added in R2 resulting in a lower molecular weight for the SANE. The details and results are set forth below:

| COMPARISON OF R1 CONDITIONS/PRODUCTS | | |
|---|---|---|
| | Example 3A | Example 3B |
| R1 % Solvent | 17.9 | 14.9 |
| R1 Temperature, °C. | 83 | 79 |
| % Rubber | 15.1 | 14.9 |
| % Graft | 63.9 | 58 |
| Dw | 0.63 | 0.52 |
| R1 Mv (SANE) | 138 | 186 |
| Product Mv (SANE/SAN) | 87 | 60 |
| IDI, Joules | 23 | 0.3 |
| Izod, Joules/m | 179 | 3.8 |
| Tensile Strength at Yield, MPA | 36.7 | 29.4 |
| Viscosity, KPA-S @ 1000 sec$^{-1}$ | 0.35 | 0.17 |
| Gloss | 41.5 | 65.3 |

Lower solvent levels increase the rate of polymerization due to higher monomer concentration in R1 and thereby make higher molecular weight at a lower temperature. Significantly higher molecular weight was obtained in R1 in Example 3B (186 Mv) resulting in smaller rubber particle size in the products and glossier surface in the molded chips. However, the impact strength of the above product was very low due to excessively low matrix molecular weight in the product. This shows the need to select the critical conditions required to obtain the desired balance of properties.

EXAMPLE 4

This example shows the effect of solvent type on the properties of the resulting ABSE. The process of Example 2B and Diene 35 rubber is used here. The details and results are set forth below.

| THE EFFECT OF SOLVENT TYPE | | | |
|---|---|---|---|
| Example | 4A | 4B | 4C |
| Solvent Type (R1/R2) | MPK/MPK | MEK/Hexene | MEK/MEK |
| Dw | 0.5 | 0.57 | 0.56 |
| Mv matrix | 125 | 122 | 98 |
| IDI, Joules/m | 22.7 | 23 | 20 |
| Izod, Joules/m | 288.6 | 162.8 | 129.4 |
| Tensile Strength at Yield, MPA | 36 | 33.9 | 34.4 |
| Viscosity, KPA-S | 0.36 | 0.34 | 0.36 |
| Gloss | 75 | 66 | 54 |

Results show that Example 4B with a mixture as solvent yielded a product with a particle size and slightly lower matrix solvent, gloss, Izod impact and tensile than are with MEK as solvent also yielded a larger rubber size, lower Izod impact lower gloss than 4A. The use of MPK as the desirable effect of making ABS with particles, glossier molded surface higher Izod impact.

EXAMPLE 5

This Example shows the effect of using a temperature and TBEC in R2 as an initiator. The results are set forth below. Diene used; the chain transfer agent is is MPK in both R1 and R2.

| THE EFFECT OF LOWER R2 TEMPERATURE WITH TBEC AS INITIATOR | | | |
|---|---|---|---|
| Example | 5A | 5B | 5C |
| Feed | R1/R2 | R1/R2 | R1/R2 |
| Initiator Type | TBPD | TBPD/TBEC | TBPD/TBEC |
| % DBF | 5.96/0 | 5.96/0 | 5.72/0 |
| % Rubber | 8.3/0 | 8.3/0 | 8.0/0 |
| % Styrene | 43.8/1.0 | 43.7/1.0 | 42.04/1.2 |
| % AN | 9.5/10.1 | 9.5/10.0 | 9.1/11.5 |
| % Solvent | 11.9/8.2 | 11.9/8.2 | 11.4/9.5 |
| % Initiator | 0.028/0 | 0.028/0.062 | 0.027/0.142 |
| % CTA | 0/0 | 0/0.082 | 0/0.095 |
| % Mineral Oil | 0/1.12 | 0/1.15 | 0/1.15 |
| % Irganox 1076 | 0/0.083 | 0/0.087 | 0/0.087 |
| Subtotal | 79.5/20.5 | 79.4/20.6 | 76.3/23.7 |
| Conditions | R1/R2/DV | R1/R2/DV | R1/R2/DV |
| Temperature (°C.) | 80/166/226 | 81/147/245 | 80/126/245 |
| Residence Time (hrs.) (R1/R2) | 1.98/1.56 | 2.03/1.66 | 2.04/1.62 |
| % Solids (R1/R2) | 27/59 | 25.6/63 | 25.8/61.5 |
| STRUCTURE AND COMPOSITION for R1 and R2 when two values are given, single value is for final product. | | | |
| % DBF | 9.6 | 8.6 | 7.8 |
| % AN by CHN | 16.6/24.5 | 17.3/25.3 | 17.3/25.2 |
| % Rubber by MB | 38.8/14.1 | 40.9/13.2 | 40.5/13.0 |
| % Gel Level | 58.7/25.3 | 60.5/23.6 | 60.5/24.3 |
| % Graft | 51.3/79.2 | 48.0/78.7 | 49.2/87.2 |
| SI | 19.9 | 11.5 | 11.2 |
| Dw | 0.498 | 0.519 | 0.600 |
| Mv matrix | 234/125 | 206/111 | 206/117 |
| % Oligomer | 0.87 | 0.15 | 0.12 |
| PRODUCT PROPERTIES | | | |
| IDI, J/m | 22.7 | 23.9 | 23.7 |
| Izod, J/m | 288.6 | 140.6 | 171.3 |
| Tensile Strength at Yield, MPA | 36.02 | 41.94 | 41.34 |
| Apparent Viscosity | 0.36 | 0.26 | 0.28 |
| Vicat, °C. | 95.6 | 102.7 | 105.2 |
| Gloss, 2.5 sec | 75 | 69.3 | 49.5 |

In Examples 5B and 5C, the R2 temperature was lowered and instead of operating R2 thermally at 166° C., TBEC was added in R2 as an initiator to control polyrate and conversion; to increase rubber phase cross-linking; and to control matrix molecular weight. The results confirmed that more rubber phase cross-linking was obtained as indicated by the sharp drop of swelling index (SI) of Examples 5B and 5C. versus 5A. Tensile strength increased and Vicat softening temperature went up 7-9° C. which was unexpected and surprising. This is because a relatively high level of dibutylfumarate (8.6% based on total S/AN/DBF level) was incorporated in the matrix as an internal plasticizer. It was expected that the heat distortion of these products would be lower than ABS without an ester component. Tests showed that Examples 5B and C had very low level of oligomers, much lower than the process used in 5A. Excluding the residue DBF, total oligomers level in the samples from 5B and C. were only about 0.15%, which is 5 to 6 fold less than in the ABSE made by the 5A process. Most importantly, the product made from Example 5B demonstrated an excellent balance of all key properties: gloss, tensile, impact and flow. In addition the product had the morphology illustrated in FIG. V.

In Example 5C, even lower R2 temperature was tested, and the results showed that larger rubber particles were obtained in the samples, causing lower gloss. This experiment demonstrated the importance of every step in the present process in preparing ABS products with high gloss. The key to obtaining a good balance of properties is to make small rubber particles in R1, and maintain the dispersion stability of these rubber particles in the SANE matrix in each of the R1, R2 and DV processing step. This is accomplished by the amounts of DBF, use of solvent in R1 and R2, the type of solvent used in R1 and R2, the conversion of monomer to polymer in R1 and the temperatures used in R1 and R2. In regard to R1 and R2, the temperatures used in R1 are in the range of 65° to 95° C. and preferably 75° to 85° C; and the temperature used in R2 are in the range of 120° to 160° C. and preferably 135 to 150° C.

In the preferred embodiments of the present invention, about 22% of the total polymer made is in R1 with about 78% being made in R2. About 60% of the graft polymer is made in R1 and about 40% is made in R2. About 17% of the matrix polymer is made in R1 and 83% is made in R2. Polymer composition was about 69/17/14 wt. % (S/AN/DBF) for the polymer made at R1 and about 66/27/7 wt. % (S/AN/DBF) for the polymer made at R2. Composition for the graft polymer in the final product was about 68/21/11 wt. (S/AN/DBF) versus 66/25/9 wt. % (S/AN/DBF) for the matrix polymer.

However, it will be readily recognized that the starting materials and reaction conditions may be varied to vary the amounts of each polymer formed in each reactor. Preferably the above amounts will vary only ±20% of the values listed.

What is claimed is:

1. An acrylonitrile-diene rubber-styrene-ester polymer made by a continuous mass polymerization process having a matrix phase comprising a copolymer comprising at least 20 weight percent of a monalkenyl aromatic monomer, at least five weight percent of an ethylenically unsaturated nitrile monomer and at least five weight percent of an ethylenically unsaturated monomeric ester which is a whole or partial ester of a mono or dicarboxylic acid and a dispersed phase comprising diene rubber particles having a grafted superstrate of a copolymer of a monoalkenylaromatic monomer, an ethylenically unsaturated nitrile monomer and an ethylenically unsaturated monomeric ester which is a whole or partial ester of a mono or dicarboxylic acid and wherein the diene rubber is a conjugated diene rubber or mixtures of such rubbers used in an amount such that the final acrylonitrile-butadiene-styrene-ester polymer contains 10 to 25 weight percent of diene rubber based on the total polymer weight; wherein the acrylonitrile-diene rubber-styrene-ester polymer is characterized by having the following properties:
   (a) a gloss level of at least 50%;
   (b) an Izod impact of at least 120 J/M;
   (c) an IDI impact of at least 15 J;
   (d) a tensile strength of at least 36 MPa;
   (e) a melt viscosity (KPa-S) of less than 0.45; and a rubber phase morphology characterized by having a bimodal distribution of rubber particles wherein 10 to 30% of the rubber particles have Dw of from 0.6 to 1.0 micron and 70 to 90% of the rubber particles have a Dw of from 0.2 to 0.6 microns and wherein the smaller particles are substantially free of occluded matrix polymers and wherein a majority of the large particles have a "low level of occluded matrix polymer as represented by the structures of the larger particles in FIG. V A & B" in the form of an interpenetrating network.

2. A polymer as in claim 1 wherein the matrix phase comprises a copolymer of a styrene monomer, a (meth)acrylonitrile monomer and an ethylenically unsaturated monomeric ester.

3. A polymer as in claim 2 wherein the matrix phase comprises a styrene monomer, a (meth) acrylonitrile monomer, and dibutylfumarate.

4. A polymer as in claim 1 wherein the rubber phase is a grafted diene rubber.

5. A polymer as in claim 4 wherein the rubber phase is a grafted butadiene homopolymer or copolymer.

* * * * *